United States Patent

[11] 3,583,162

- [72] Inventor: Thomas A. Neely, St. Simons Island, Ga.
- [21] Appl. No.: 805,142
- [22] Filed: Mar. 7, 1969
- [45] Patented: June 8, 1971
- [73] Assignee: Thiokol Chemical Corporation, Bristol, Pa.

[54] CLOSURE AND SOLID PROPELLANT GRAIN SUPPORT FOR A SOLID PROPELLANT ROCKET MOTOR
5 Claims, 3 Drawing Figs.

- [52] U.S. Cl. .................................................. 60/255
- [51] Int. Cl. ................................................. F02k 9/04
- [50] Field of Search ................................ 60/39.47, 255

[56] References Cited
UNITED STATES PATENTS
| | | | |
|---|---|---|---|
| 3,009,385 | 11/1961 | Burnside | 60/255X |
| 3,121,993 | 2/1964 | Pennington | 60/255 |

Primary Examiner—Douglas Hart
Attorney—Thomas W. Brennan

ABSTRACT: A closure for sealing the nozzle of a rocket motor having attached thereto a flexible, inflatable, self-contracting support for the solid propellant grain in the rocket motor.

PATENTED JUN 8 1971 3,583,162

Thomas A. Neely INVENTOR.

BY Robt J Williams Jr

ATTORNEY 3,583,162

CLOSURE AND SOLID PROPELLANT GRAIN SUPPORT FOR A SOLID PROPELLANT ROCKET MOTOR

BACKGROUND OF THE INVENTION

1. Field of the Invention

Closures for insertion into the nozzle of a rocket motor have been used to prevent deterioration of the solid propellant grain in the rocket motor during storage or transportation thereof.

Inflatable or solid support means have been positioned in the cavity in the solid propellant grain to prevent slump and other damage to the solid propellant grain, but the drawback to supports of this type have been the removal of such supports prior to ignition of the solid propellant grain in the solid propellant rocket motor.

The instant invention contemplates the use of a flexible inflatable, self-contracting support that is attached to a closure for sealing the nozzle of a solid propellant rocket motor, so that when the closure is removed by hand or by the combustion products created by the burning of the solid propellant grain, the self-contracting support will be removed from the solid propellant rocket motor simultaneously with the removal of the closure from the nozzle.

2. Description Of The Prior Art

Solid supports, such as mandrels and similar configurations, have been used to support a solid propellant grain, but care has to be taken to prevent damage to the solid propellant grain and since the mandrel is sometimes larger than the throat of the nozzle, time is lost removing the mandrel from the cavity, even when saving time or rapid action is essential.

Inflatable supports have been used, but here again the removal of such supports must be accomplished with care and is also time consuming.

The instant invention, however, overcomes these drawbacks, because being self-contracting, it becomes of a size that will pass through the throat of the nozzle without damaging the solid propellant grain as it contracts and is then removed from the rocket motor by the ejection of the closure from the nozzle.

SUMMARY OF THE INVENTION

This invention relates to improvements in closures for the nozzles of solid propellant rocket motors wherein the closure prevents moisture and other debris from entering the solid propellant rocket motor and a self-contracting solid propellant grain support connected to the closure, so that when the support for the solid propellant grain is inserted into the cavity in the solid propellant grain in the solid propellant rocket motor, it will prevent slump of the solid propellant grain during storage and transportation of the solid propellant rocket motor.

One of the major problems in solid rocketry is the slow deformation caused by slump of the solid propellant grain which is occasioned by its own weight. This action is caused by the cavity, whatever its configuration may be, in the solid propellant grain, when the surface of the solid propellant grain is unsupported. Therefore, any slump that may be created over a long or short period of time, during the transportation or storage of the solid propellant rocket motor is detrimental to the functioning of the solid propellant rocket motor.

Another problem that exists is the entrance of moisture or other debris into the solid propellant rocket motor through the nozzle and the resultant damaging of the solid propellant grain. It has been determined, therefore, that if a closure is positioned in the nozzle, such damage to the solid propellant grain will be eliminated.

It is, therefore, an object of the invention to provide a closure for the nozzle having a self-contracting inflatable flexible support connected thereto to prevent moisture damage to the solid propellant grain or prevent slump of the solid propellant grain during the storage or transportation of a solid propellant rocket motor.

It is another object of the invention to provide a closure that may or may not be fragmental and ejected from the nozzle of the rocket motor when the solid propellant grain has been ignited and whereby the ejection of the closure will also cause simultaneous ejection of a self-contracting support for the solid propellant grain which is connected to the closure.

The above and other objects and advantages of the invention will become apparent to a person skilled in the art from the following detailed description when taken in connection with the accompanying drawing in which:

DESCRIPTION OF THE PREFERRED EMBODIMENT

Figure 1:
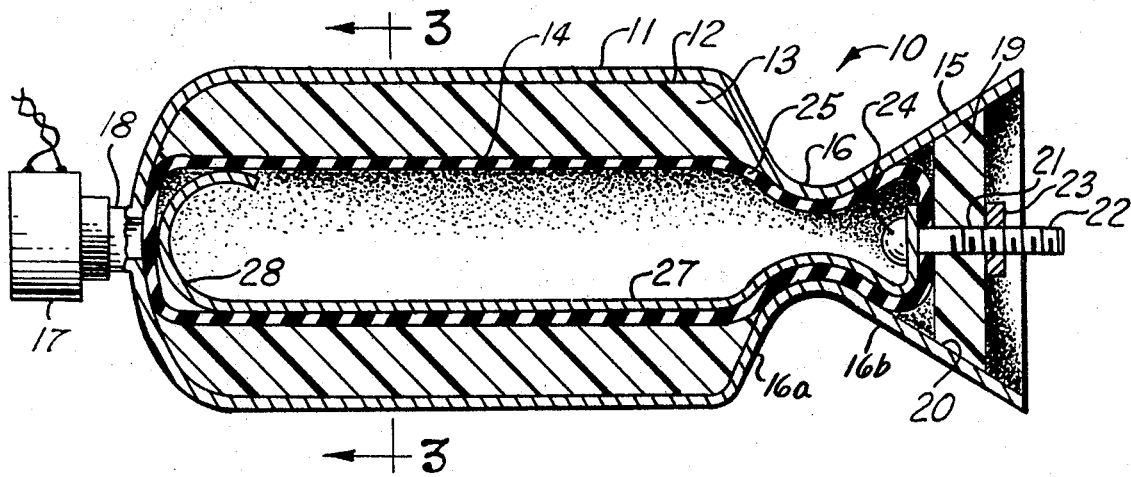
FIG. 1 is a longitudinal sectional view of a solid propellant rocket motor illustrating the manner in which the closure for the nozzle and the inflatable support for the solid propellant grain is connected thereto and embodies the invention as they are installed in the nozzle and in the solid propellant rocket motor.

Referring more in detail to the drawing wherein like parts have been designated by like reference numerals, the reference numeral 10 is used to generally designate a solid propellant rocket motor.

As is conventional the solid propellant rocket motor 10 comprises a motor case 11 forming a combustion chamber 12 therein in which is positioned a solid propellant grain 13 having a central cavity 14 therein. A discharge nozzle 15 is connected to or formed integral with the aft end of the motor case 11 and the nozzle 15 is provided with the usual throat 16 a convergent cone 16a and a divergent cone 16b through which the products of combustion created by the burning of the solid propellant grain 13 is ejected after it has been ignited by a conventional igniter 17, that communicates with the combustion chamber 12 by means of a throat 18 that is formed integral with the motor case 11 at the head end thereof.

The invention contemplates a circular closure 19 that has the peripheral edge 20 thereof contoured to conform to the configuration of the inner surface of the nozzle 15 divergent cone 16b, so that it can be positioned therein to seal the nozzle, as shown in FIG. 1. The closure 19 has a centrally located aperture 21 therein through which extends a valve 22 that is similar in all respects to the valve that is utilized with an inner tube for an automobile tire whereby the valve permits air under pressure to enter the inner tube, but prevents escape of the air therefrom, unless the valve is manually manipulated to permit the escape of such air. A lock nut 23 on the valve 22 retaining it in fixed relation to the closure 19.

Figure 3:
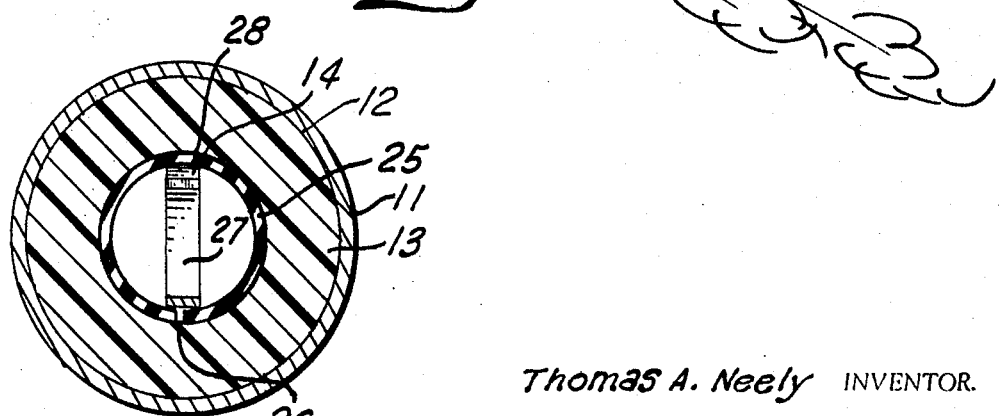
FIG. 3 is a cross-sectional view of the assembly of FIG. 1 on the line 3–3 thereof.

The inner end of the valve 22 has an enlarged head 24 thereon, that will retain on the valve 22 a flexible inflatable bag or solid propellant grain support 25, when the outer end of the valve 22 has been inserted through an opening in one end of the flexible inflatable bag or solid propellant grain support 25. The inflatable bag or solid propellant grain support 25 has a longitudinally extending seam 26, which is shown in an enlarged position in FIG. 3 for a clearer understanding thereof, through which is inserted the valve 22 and a heavy-duty coil spring 27 that has one end which is mounted on the valve 22 and retained thereon by the enlarged head 24, while the opposite coiled end 28 of the coil spring 27 is bonded to the inner end of the inflatable bag or propellant grain support 25, as shown in FIG. 1, it also being noted that the seam 26 is also bonded to the coil spring 27 for the major length thereof, as shown in FIG. 3.

There are many forms of implements or mechanisms, either hand actuated or hydraulically actuated that will straighten the coil spring 27 so that the solid propellant grain support 25 may be applied thereto, as previously described, electromagnets may also be used as in the instant application, then after the coil spring 27 has been bonded in position, the solid propellant grain support 25 may be inflated through the medium of the valve 22 and any leaks that may occur may be suitably sealed.

Figure 2:
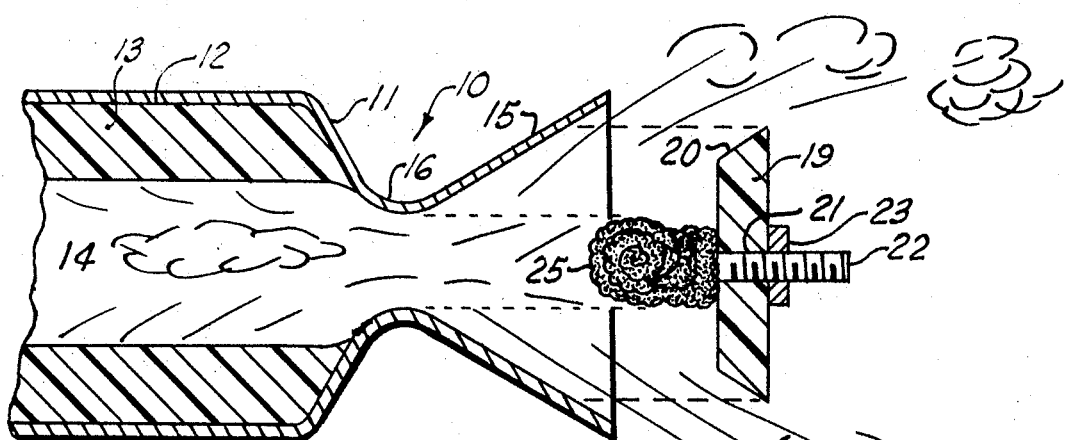
FIG. 2 is a detailed fragmentary view of the solid propellant rocket motor of FIG. 1, showing the support for the solid propellant grain contracted and the closure for the nozzle being ejected from the nozzle by the combustion products created by the burning of the solid propellant grain in the solid propellant rocket motor.

In the 50 of the device embodying the invention, the solid propellant grain 38 25 being self-contracting, 44 be in the form shown in FIG. 2 at which time it can be inserted into the nozzle 15, so that when the closure 19 for the nozzle is moved or pushed into position, as shown in FIG. 1, the solid propellant grain support 25 can be inflated by connecting an air supply hose from a suitable source of air under pressure to the valve 22 and permitting the air under pressure to be injected into the solid propellant grain support 25 until it is in close contact with the entire surface of the cavity 14 and the convergent cone 16a, throat 16 and divergent cone 16b, as shown in FIG. 1. When the solid propellant grain 13 is to be ignited by the ignition 17, the valve 22 is opened, permitting the air under pressure to be ejected through the valve 22 outwardly of the solid propellant grain support 25. Inflatable bag or propellant grain support 25 is prevented from being ejected from nozzle 15 when inflated by means of convergent cone 16a and the constriction in throat 16. Upon the release of the pressure in the solid propellant grain support 25, the spring 27 will coil upon itself to contract the solid propellant grain support 25, as shown in FIG. 2, then after the ignition of the solid propellant grain 13, the combustion gases that are created by the burning of the solid propellant grain 13 will create sufficient pressure to eject the closure 19 from the nozzle, as shown in FIG. 2. When the closure 19 of the nozzle is ejected, it will pull the solid propellant grain support 25 outwardly of the nozzle 15 through throat 16 since it is now in collapsed condition and the solid propellant rocket motor 10 will function as required.

There has thus been described an assembly including a closure that is to be used to seal the nozzle of a solid propellant rocket motor and a self-contracting inflatable solid propellant grain support that is utilized to prevent the slump of a solid propellant grain in the solid propellant rocket motor connected to the closure for the nozzle of the solid propellant rocket motor and is then adapted to be ejected from the solid propellant rocket motor when the pressure of the combustion gases, created by the burning of the solid propellant grain, ejects the closure for the nozzle therefrom.

Having thus described the invention what I claim as new and desired to be secured by Letters Patent is:

1. In combination with a solid propellant rocket motor, said propellant thereof having at least one internal unsupported surface subject to deformation, or distortion under its own weight, said motor comprising a casing containing said propellant and a nozzle including a convergent cone and a divergent cone with a throat therebetween connected to said casing, means for preventing such deformation, or distortion comprising;

closure means in said nozzle having outer surfaces conforming to the inner surface of said divergent cone and adapted to be ejected therefrom by combustion gases emanating from said solid propellant upon ignition thereof, a flexible, inflatable support means attached to said closure means in said motor adapted upon being inflated to support said propellant surface and prevent deformation, or distortion thereof, means for inflating said support means, and contractable means attached to said support means for contracting said support means when said support means is deflated.

2. The combination of claim 1 wherein the contractable means is an extended coil spring positioned within said inflatable support means and bonded thereto whereby upon deflation of said support means said spring contracts by coiling and to collapse said support means.

3. The combination of claim 2 wherein said means for inflating said support means is a valve for passage of a pressurizing gas therethrough.

4. The combination of claim 3 wherein said valve is provided with an enlarged head for retaining one end of said coil spring on said closure means.

5. The combination of claim 4 further including means for retaining said valve and said coil spring in fixed relation to said closure means.